*Bowen & Robnett,*

*Plow.*

No. 111,033. Patented Jan. 17, 1871.

Witnesses.

H. R. Bowen
L. D. Robnett
Inventors

UNITED STATES PATENT OFFICE.

HIRAM R. BOWEN AND LORENZO D. ROBNETT, OF NEW WASHINGTON, IND.

IMPROVEMENT IN PLOWS.

Specification forming part of Letters Patent No. 111,033, dated January 17, 1871.

*To all whom it may concern:*

Be it known that we, HIRAM R. BOWEN and LORENZO D. ROBNETT, of New Washington, in the county of Clarke and State of Indiana, have invented new and useful Improvements in Subsoil-Plows; and we do hereby declare the following to be a full, clear, and exact description of the same, reference being had to the accompanying drawings, making a part of this specification, in which—

Figure 1:
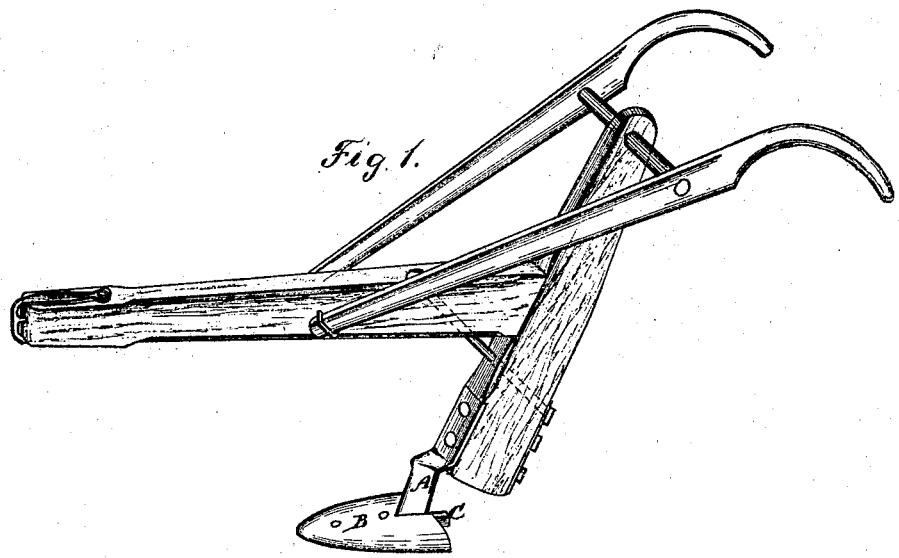
Figure 2:
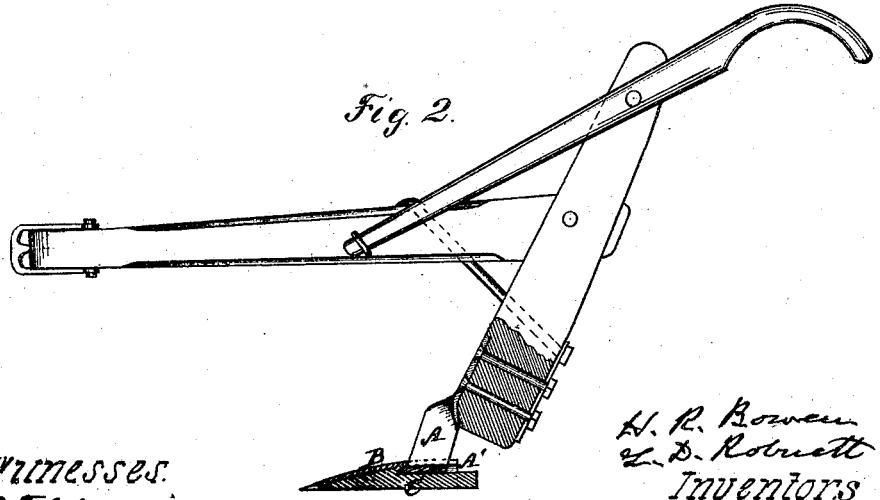

Figure 1 is a perspective view of our improved subsoil-plow. Fig. 2 is a side elevation, showing a portion in section.

The same letters of reference, where employed in the several figures, indicate identical parts.

This invention relates to subsoil-plows; and our improvement consists in the construction of the shovel and upright and their arrangement with reference to the standard, as will be more specifically pointed out in the subjoined description and claim.

To enable others skilled in the art to make and use our invention, we will proceed to describe its construction and operation.

Our subsoil-plow is designed to follow in the track of a common turn-plow, and to enter the soil some six inches (more or less) below the bottom of the furrow made by the latter, for the purpose of loosening up the earth, and it may be successfully operated by a boy and one horse.

The construction of the beam, handle, and standard is plainly shown in the drawings, and as these parts, separately considered, are no part of our improvements, they need not be more specifically described herein.

To the lower portion of the wooden standard the upright A is bolted, which consists of a bar of metal twisted at the joint where it leaves the standard, so that its edges will be in line with the line of draft, its forward edge being properly sharpened, that it may easily cut the soil in being drawn forward. This upright terminates at its lower end in a transverse horizontal flange or plate, A', having a curved upper surface corresponding to the curvature of the shovel B, which is fastened upon it by riveting or other suitable manner. The shovel is a concavo piece of metal of the proper size, pointed at the forward end and square at the rear, as shown. A slot is formed in its rear portion to admit the upright, to the flange of which it is secured, so as to assume a nearly horizontal position.

The shovel is provided with the usual shoe, C, in the manner shown.

What we claim, and desire to secure by Letters Patent, is—

The subsoil-plow herein described, composed of the beam, handles, and standard, as shown, and twisted sharpened upright A, with flange A', concavo-convex shovel B, and sole or shoe C, all constructed and arranged relatively to one another as set forth.

In testimony whereof we have signed our names to this specification in the presence of two subscribing witnesses.

HIRAM R. BOWEN.
L. D. ROBNETT.

Witnesses:
WM. P. WALKER,
JAS. O. DOUGAN.